UNITED STATES PATENT OFFICE.

STEPHEN BROWN, OF NEW YORK, N. Y.

CATAPLASM OR POULTICE.

SPECIFICATION forming part of Letters Patent No. 240,959, dated May 3, 1881.

Application filed January 13, 1881. (Specimens.)

*To all whom it may concern:*

Be it known that I, STEPHEN BROWN, a citizen of the United States, residing at the city of New York, in the county and State of New York, have invented a new and Improved Poultice or Cataplasm, and a new and useful composition of matter adapted to such improved method of preparation and application, and which is intended to be used for all the purposes of a cataplasm, of which the following is a specification.

My composition consists of the following ingredients, combined in the proportions and in the manner stated—that is to say, glycerine and gelatine, from thirty to fifty per centum each, according to the season and climate in which the poultice is to be used; Irish moss, five per centum; extract of bark of European larch, sometimes sold as Venice turpentine, (see Wood and Bache Dispensary, page 901, fourteenth edition,) said to be the article that gives the peculiar odor to Russia leather, five per centum; gum-tragacanth, five per centum; extracted mucilage of flaxseed, five per centum; extracted mucilage of slippery-elm bark, five per centum. These ingredients are to be thoroughly mingled by heat and agitation. The composition thus formed is to be spread evenly while hot upon one side of cloth or any woven fabric with flat hand-brushes or with cylinder-shaped brushes and machinery. The cloth used may be made of any desired substance, thickness, or color. The composition, when thus prepared and applied to the cloth, is to be thoroughly dried by natural or artificial heat in any convenient manner. Rubber sheeting, oiled silk, or other thin impermeable substance, is to be spread over the back of the poultice loosely, or fastened to it by any adhesive compound; or any impermeable compound may be applied to the back of the poultice in the same manner that the poultice is applied to the cloth. The poultice is then ready for use.

In using the above-named composition a piece of the poultice of proper size to thoroughly cover the inflamed part is to be cut out, immersed in water until it becomes pulpy, and then immediately applied. Over the poultice thus applied a piece of rubber sheeting or oiled silk is to be placed, and the whole fastened to the person by strips of adhesive plaster.

This poultice is imperishable, and will retain its virtues in any season and climate for a long series of years. It may be used with striking advantage as a medium in the application of counter-irritants and sedatives. It may be medicated before application in any manner that may be desired. It is always ready for use, and when applied will retain its moisture and position for more than twenty-four hours. It obviates the use of cloths, and hence all danger of infection. It is convenient and perfectly cleanly, and possesses, in addition, all the advantages of the ordinary poultices.

I am aware that slippery-elm bark, Irish moss, and flaxseed have been used in compounding poultices; but I am not aware that all of the ingredients of my composition in the proportions stated have ever been used together or applied in a similar manner.

Having thus briefly described my invention, I claim—

A cataplasm or poultice consisting of a fabric coated or impregnated with gelatine, glycerine, Irish moss, extract of bark of European larch, gum-tragacanth, mucilage of flaxseed, and mucilage of slippery-elm bark, in proportions substantially as set forth.

STEPHEN BROWN.

Witnesses:
SAML. H. LYMAN,
HENRY N. TIFFTS.